(12) United States Patent
Han et al.

(10) Patent No.: US 7,148,843 B2
(45) Date of Patent: Dec. 12, 2006

(54) ENHANCED REAL TIME KINEMATICS DETERMINATION METHOD AND APPARATUS

(75) Inventors: Shaowei Han, Palo Alto, CA (US); Kevin Xinhua Chin, Palo Alto, CA (US)

(73) Assignee: Thales North America, Inc., Santa Clara, CA (US)

( * ) Notice: Subject to any disclaimer, the term of this patent is extended or adjusted under 35 U.S.C. 154(b) by 0 days.

(21) Appl. No.: 10/610,541

(22) Filed: Jul. 2, 2003

(65) Prior Publication Data

US 2005/0001762 A1 Jan. 6, 2005

(51) Int. Cl.
*G01S 5/14* (2006.01)
(52) U.S. Cl. .............................. 342/357.02; 342/357.04
(58) Field of Classification Search ........... 342/357.02, 342/357.04, 357.07
See application file for complete search history.

(56) References Cited

U.S. PATENT DOCUMENTS

| | | | |
|---|---|---|---|
| 4,906,949 A | | 3/1990 | Pocholle et al. |
| 5,160,991 A | | 11/1992 | Delacourt et al. |
| 5,825,326 A | * | 10/1998 | Semler et al. ......... 342/357.04 |
| 5,935,194 A | * | 8/1999 | Talbot et al. ............... 701/214 |
| 6,052,082 A | * | 4/2000 | Hassan et al. ......... 342/357.04 |
| 6,259,398 B1 | | 7/2001 | Riley |
| 6,611,228 B1 | * | 8/2003 | Toda et al. ............ 342/357.04 |
| 2002/0050943 A1 | | 5/2002 | Hiroyuki et al. |

OTHER PUBLICATIONS

Ueno, Michio et al, "Evaluation of RTK-OTF Positioning System For Free Running Manoeuverability Test of a Model Ship," IEEE Conf Proc OCEANS 1997, pp. 1120-1125.*

Park, Chansik et al, "Efficient Ambiguity Resolution Using Constraint Equation," IEEE PLANS 1996, pp. 277-284.*

Han, Shaowei et al, "Integrated Method for Instantaneous Ambiguity Resolution Using New Generation GPS Receivers," IEEE PLANS 1996, pp. 254-261.*

Abidin, Hasanuddin Z. "Multii-Monitor Station 'On the Fly' Ambiguity Resolution: The Impacts of Satellite Geometry and Monitor Station Geometry," IEEE PLANS 1992, pp. 412-418.*

Kim, Donghyum et al "GPS Ambiguity Resolution and Validation: Methodlogies, Trends and Issues," 7th GNSS Workshop-International Symposium on GPS/GNSS, Seoul, Korea, Nov. 2000, 9 pages.□□□□.*

Han & Rizos, "Integrated Method for Instantaneous Ambiguity Resolution Using New Generation GPS Receivers" IEEE PLANS '96, (Apr., 1996), pp. 254-261.

Han & Rizos, "A New Method for Constructing Multi-satellite Ambiguity Combinations for Improved Ambiguity Resolution," Proceedings of ION GPS-95, 8th International Technical Meeting of the Satellite Division of the Institute of Navigation (1995), pp. 1145-1153.

(Continued)

*Primary Examiner*—Gregory C. Issing
(74) *Attorney, Agent, or Firm*—Lowe Hauptman & Berner, LLP

(57) ABSTRACT

A method of and computer-readable medium containing instructions for high accuracy, reliable position determination. A high precision GPS-RTK system using the present novel techniques is initialized instantaneously or near instantaneously. To improve the computational efficiency and to improve the reliability of the procedure, advances in data functional and stochastic modeling, validation criteria, adaptation and system design were achieved. A position estimate using an integrated method is determined. Ambiguity resolution of the position estimate is enhanced by applying a quality control procedure using derived validation criteria. A second position estimate based on the enhanced ambiguity resolution is derived.

27 Claims, 7 Drawing Sheets

OTHER PUBLICATIONS

Han, "Quality Control Issues Relating to Ambiguitiy Resolution for Real-Time GPS Kinematic Positioning", Journal of Geodesy, Official Journal of the International Association of Geodesy (1997) 71(6), pp. 351-361.

Zhu Jian-Jun; Santerre Rock: "Improvement of GPS ambiguity resolution using prior height Information. Part 1; The method by using height validation" Journal of Central South University of Technology, vol. 9, No. 3, Sep. 2002 pp. 186-190.

Han S et al: "An instantaneous ambiguity resolution technique for medium-range GPS Kinematic Positioning" Navigation, Institute of Navigation, Washington DC, US Mar. 21, 2000, pp. 17-31.

Han S et al: "Ambiguity recovery for long range GPS kinematic positioning" Navigation. Journal of the Institute of Navigation vol. 44, No. 2, 1997, pp. 257-266.

* cited by examiner

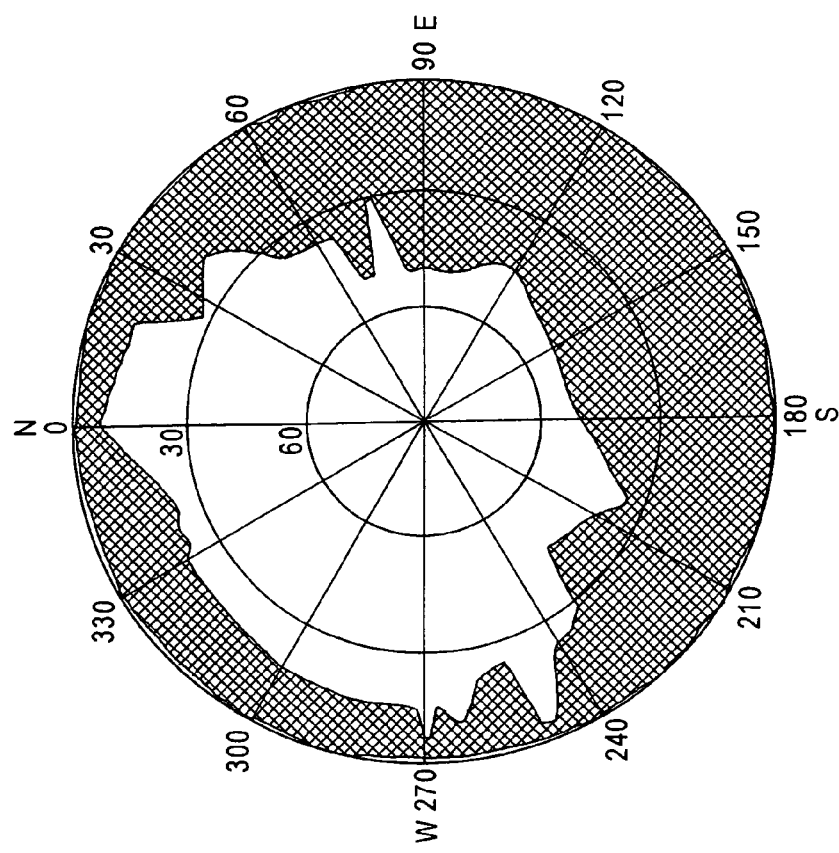
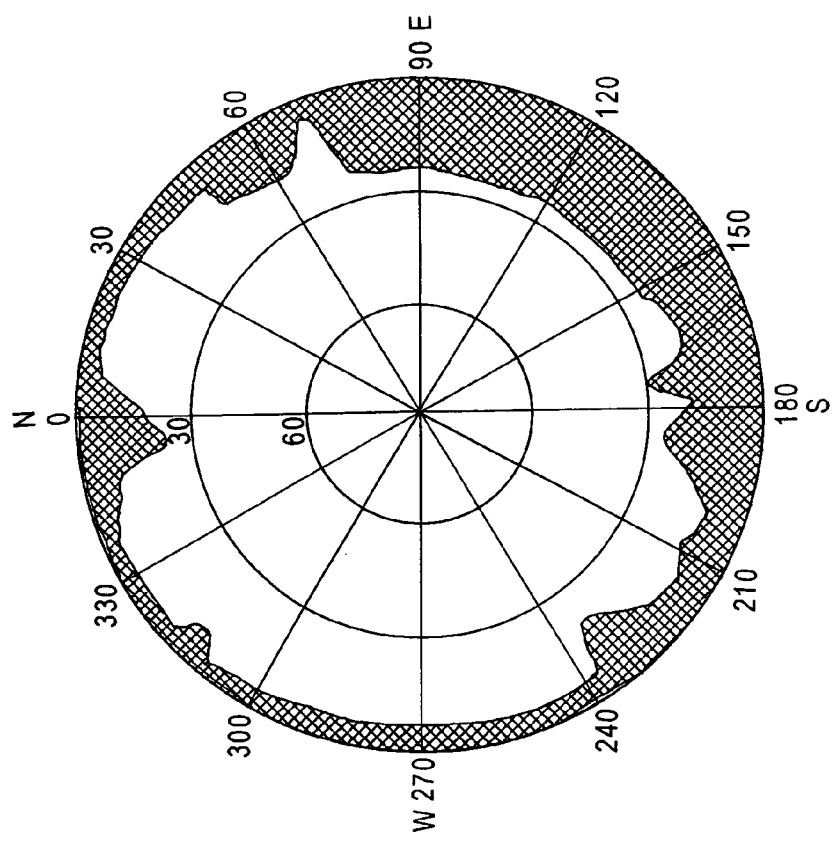
Figure 3B
Figure 3A

ENHANCED REAL TIME KINEMATICS DETERMINATION METHOD AND APPARATUS

RELATED APPLICATIONS

The present application is related to co-pending U.S. Patent Application entitled, "Enhanced Rapid Real Time Kinematics Determination Method and Apparatus," by the present inventors, assigned to the present assignee, hereby incorporated herein by reference in its entirety and concurrently filed on even date herewith.

FIELD OF THE INVENTION

The present invention relates to a method of and apparatus for an improved real time kinematics (RTK) determination.

BACKGROUND

The standard mode of precise differential positioning uses one reference receiver located at a station whose coordinates are known, while determining a second receiver's coordinates relative to the reference receiver. In addition, the second receiver may be static or moving, and carrier phase measurements must be used to assure high positioning accuracy. This is the basis for pseudo-range-based differential global positioning system (GPS) (DGPS for short) techniques. However, for high precision applications, the use of carrier phase data comes at a cost in terms of overall system complexity because the measurements are ambiguous, requiring that ambiguity resolution (AR) algorithms be incorporated as an integral part of the data processing software.

Such high accuracy techniques result from progressive research and development (R&D) innovations, subsequently implemented by GPS manufacturers in top-of-the-line "GPS surveying" products. Over the last decade, several significant developments have resulted in the high accuracy performance also being available in "real-time"—that is, in the field, immediately following measurement, and after the data from the reference receiver has been received by the (second) field receiver for processing via a data communication link (e.g. very high frequency (VHF) or ultra high frequency (UHF) radio, cellular telephone, frequency modulation (FM) radio sub-carrier or satellite communication link). Real-time precise positioning is even possible when the GPS receiver is in motion through the use of "on-the-fly" (OTF) AR algorithms. These systems are commonly referred to as "real-time kinematic" (RTK) systems, and make feasible the use of GPS-RTK for many time-critical applications, e.g. machine control, GPS-guided earthworks/excavations, automated haul truck operations, and other autonomous robotic navigation applications.

If the GPS signals were continuously tracked (loss-of-lock never occurred), the integer ambiguities resolved at the beginning of a survey would be valid for the whole GPS kinematic positioning span. However, the GPS satellite signals are occasionally shaded (e.g. due to buildings in "urban canyon" environments), or momentarily blocked (e.g. when the receiver passes under a bridge or through a tunnel), and in these circumstances the integer ambiguity values are "lost" and must be re-determined or re-initialized. This process can take from a few tens of seconds up to several minutes with present OTF AR techniques. During this "re-initialization" period, the GPS carrier-range data cannot be obtained and there is "dead" time until sufficient data has been collected to resolve the ambiguities. If GPS signal interruptions occur repeatedly, ambiguity re-initialization is, at the very least, an irritation, and, at worst, a significant weakness of commercial GPS-RTK positioning systems (see upper plot in FIG. 1). In addition, the longer the period of tracking required to ensure reliable OTF AR, the greater the risk that cycle slips occur during the crucial (re-)initialization period. A loss of lock of a receiver phase lock loop causing a sudden integer number of cycles jump in a carrier phase observable is known as a cycle slip. Receiver tracking problems or an interrupted ability of the antenna to receive satellite signals causes the loss of lock. These shortcomings are also present in any system based on data post-processing as well.

A goal of all GPS manufacturers is to develop a real-time precise GPS positioning system, able to deliver positioning results on demand, in as easy and transparent a manner as is presently the case using pseudo-range-based DGPS techniques, which typically deliver positioning accuracies ranging from 1 to 10 meters. The ambiguity initialization period must be kept as short as possible, or even to the extreme case "instant". Three general classes of AR techniques have been developed in the last decade: search techniques in the measurement domain; search techniques in the coordinate domain, and; search techniques in the estimated ambiguity domain using least squares estimation. In general, AR OTF using these techniques requires several epochs of data, causing a time delay for real-time applications. An integrated technique was then developed to take advantage of most positive characteristics from all three general classes of AR techniques, such as search efficiency or reliability, and hence make instantaneous AR more certain (Han & Rizos, "Integrated Method for Instantaneous Ambiguity Resolution Using New Generation GPS Receivers," IEEE PLANS '96, (April, 1996), pp. 254–261. However, due to the smaller degrees-of-freedom in comparison to AR OTF, quality control is a very important issue. A three-step quality control procedure was further developed to solve these problems (Han, "Quality Control Issues Relating to Ambiguity Resolution for Real-Time GPS Kinematic Positioning," Journal of Geodesy, Official Journal of the International Association of Geodesy (1997) 71(6), pp. 351–361.

There is a need in the art for an improved method of processing GPS signals to rapidly achieve high accuracy, reliable position determination. Further, there is a need in the art to apply quality control mechanisms to improve the position determination method.

SUMMARY

It is therefore an object of the present invention to provide a method of processing GPS signals for high accuracy, reliable position determination.

Another object of the present invention is to apply quality control mechanisms to improve a method of position determination.

An RTK (RTK) system of the present invention uses an integrated method incorporating a three-step quality control procedure using validation criteria. The integrated method combines the search procedures in the coordinate domain, the observation domain and the estimated ambiguity domain, and uses data from GPS receivers. The three-step procedure for enhancing the quality of AR is as follows. First, the stochastic model of the double-differenced functional model is improved. Second, discriminate between the integer ambiguity sets generating the minimum quadratic form of the residuals and the second minimum one. Third, perform the fault Detection, Identification and Adaptation procedure in which some global measures, e.g. TEC values, are used. If the AR is unsuccessful, the adaptation procedure eliminates the identified outlier observations and improves the functional model. The performance of iRTK can be shown by the lower plot in FIG. 1.

The functional model includes determining the reference satellite, residuals, and design matrix. The stochastic model includes variance-covariance matrix determination for measurements and the variance-covariance matrix for dynamic noise in Kalman filtering.

A primary object of the present invention is to provide data processing techniques providing centimeter positioning accuracy once dual frequency GPS receivers track over 5 satellites. To improve the computational efficiency and to improve the reliability of the procedure, advances in data functional and stochastic modeling, validation criteria, adaptation and system design had to be made. None of the improvements on their own deliver the performance required, but the advance required the sum of combining the present novel techniques.

1. Stochastic Model

The RTK technique requires available dual frequency pseudo-range and carrier phase measurements. On-the-fly RTK might not necessarily need pseudo-range measurements because the float solution can be derived by the change of carrier phase measurements between epochs (or Doppler measurements). However, the float solution using data from a single epoch must be derived by pseudo-range measurements. The integrated function model means modeling carrier phase measurements and also pseudo-range measurements and their stochastic features are included. The stochastic model for carrier phase measurements and pseudo-range measurements, especially the ratio between standard deviations of carrier phase and pseudo-range, significantly affects the float solution and subsequently affects the RTK performance. The present invention provides appropriate stochastic models for both carrier phase and pseudo-range to enhance RTK performance.

2. Validation Criteria

Reliable results are dependent on the appropriateness of the stochastic model of the observations with respect to the functional model. The rejection criteria should be employed in order to check the fidelity of the stochastic and functional models. The main criterium is the ratio testing. The reliability was mainly controlled by the ratio testing criteria. This invention gives a validation criteria which were built up based on different cases, e.g. based on baseline length and/or based on the open or canopy environment. For each case, the same validation criteria functions are used. The validation criteria function is dependent on the number of satellites, baseline length, preset reliability, time-to-try and an ionosphere activity indicator. Moreover, this invention gives different validation criteria for different preset reliability levels. The criteria matrix and some parameters can be tuned based on the type of receiver used.

3. Adaptation

If the resolved integer ambiguities are wrong, in general the wrong integer ambiguities refer to more than one satellite, and it is almost impossible to identify which ambiguity is incorrect. The present invention provides an adaptation procedure to overcome this problem. Moreover, the flexible Kalman resets are used to make sure that the wrong ambiguity fixing is detected and adapted very quick.

4. Innovative System Design

The GPS RTK system is designed in both time-tagged mode and fast RTK mode. The time-tagged mode provides positioning results once the measurements from the base receiver arrive. The position latency varies at approximately 1 second and the position update is limited. The fast RTK mode provides positioning results once the measurements from the rover receiver are obtained using the predicted base station corrections. The position latency from fast-RTK is below 20 ms; however, the positioning accuracy of fast-RTK is worse than time-tagged mode. How to reduce time-tagged mode latency and increase positioning update rate are the challenge for current GPS RTK systems. The present invention provides a way to reduce data transmission latency and increase the positioning update rate to 5–10 Hz (dependent on data links) without degrading the positioning accuracy for time-tagged mode.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein:

FIGS. 3A and 3B are radial coordinate graph plots depicting an open environment and a canopy environment, respectively;

FIG. 6 is a computer system on which an embodiment of the present invention may be used.

DETAILED DESCRIPTION

Figure 1A:
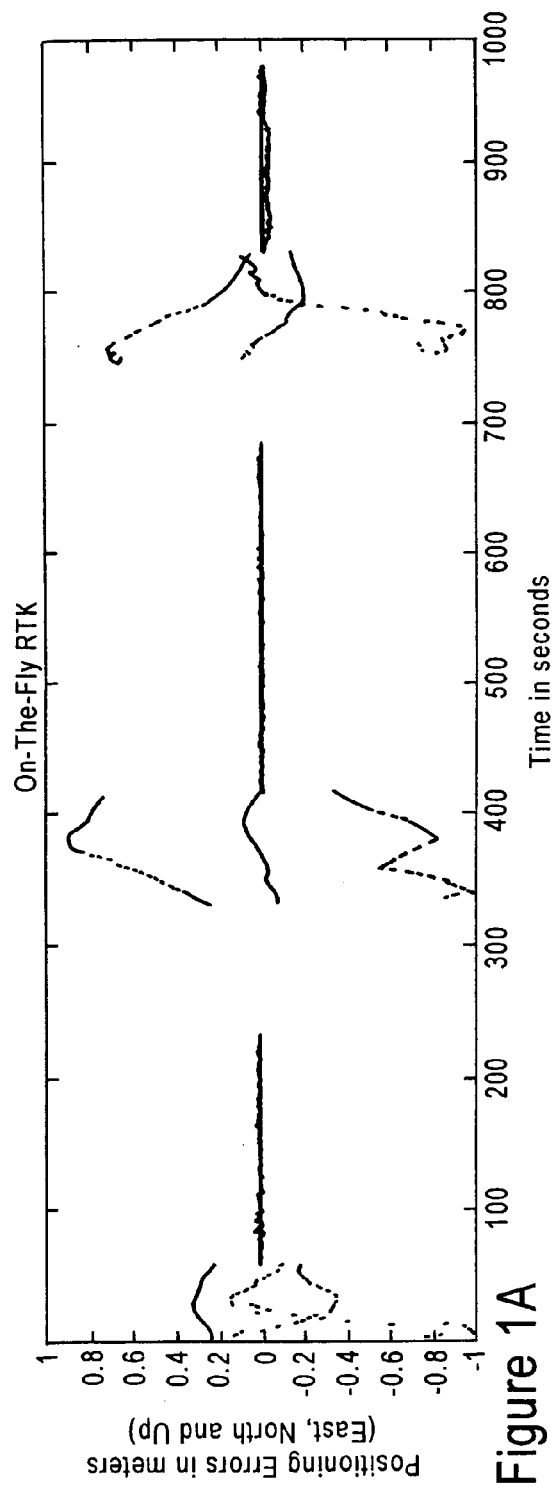
FIG. 1A is a graph of position errors in estimates from prior art RTK systems.
Figure 1B:
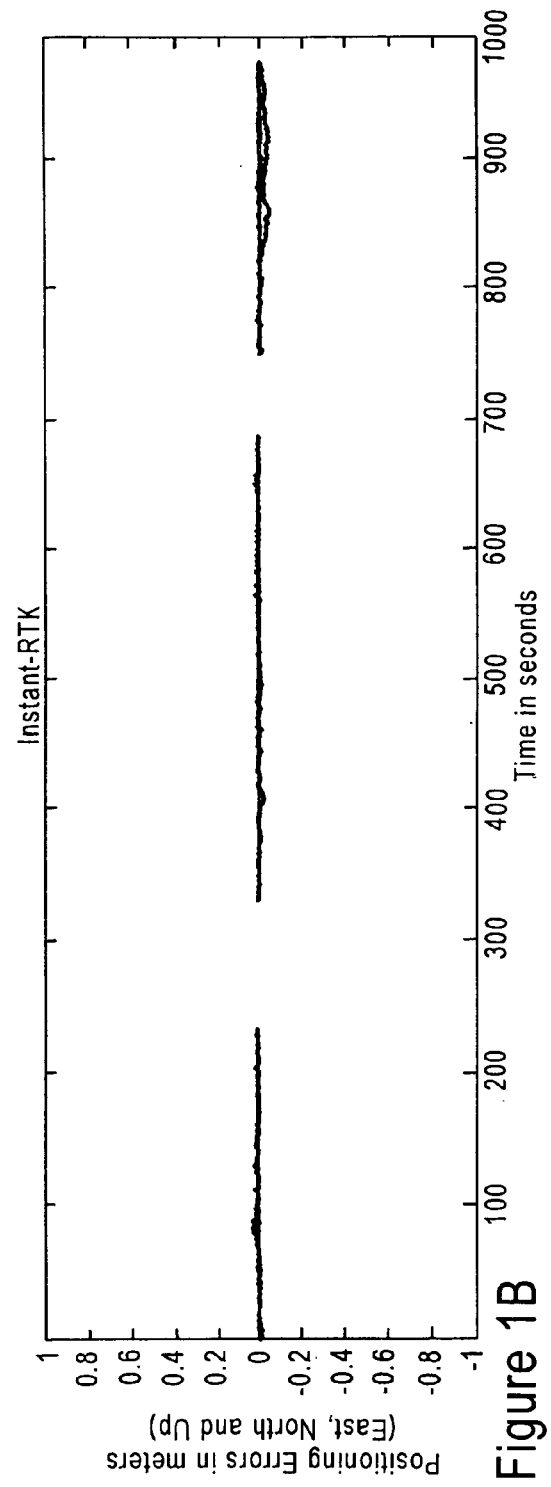
FIG. 1B is a graph of position errors in estimates from an embodiment of the present invention.
Figure 2B:
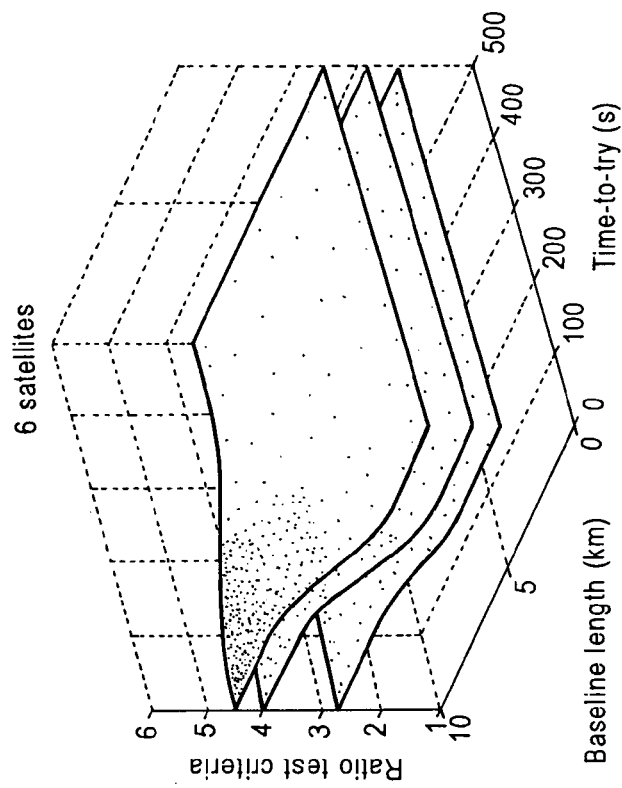
FIGS. 2A–2F are graphs of criteria values with respect to pre-set reliabilities.
Figure 2A:
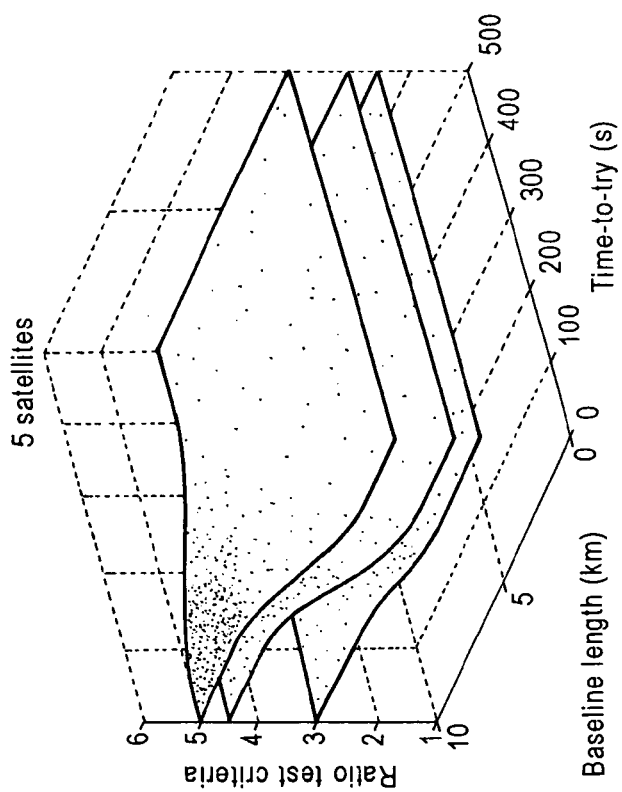
Figure 2C:
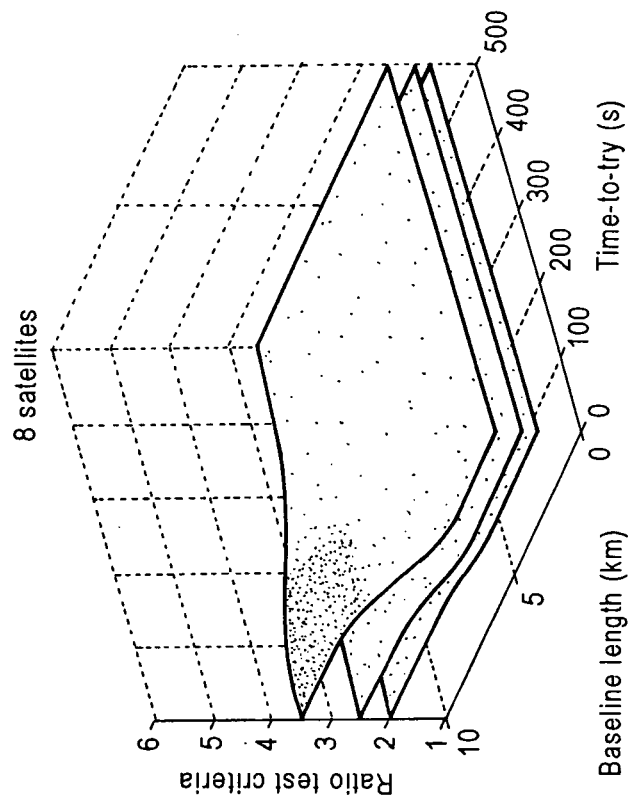
Figure 2D:
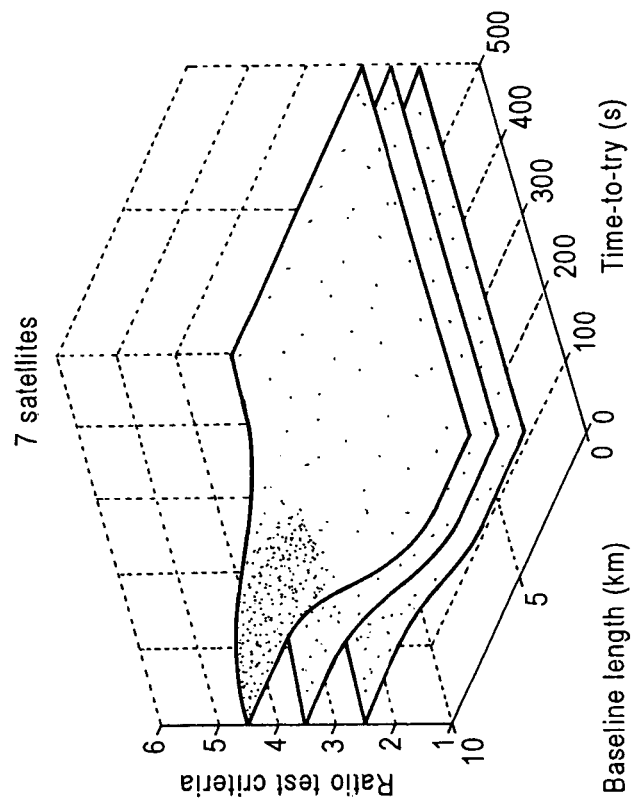
Figure 2F:
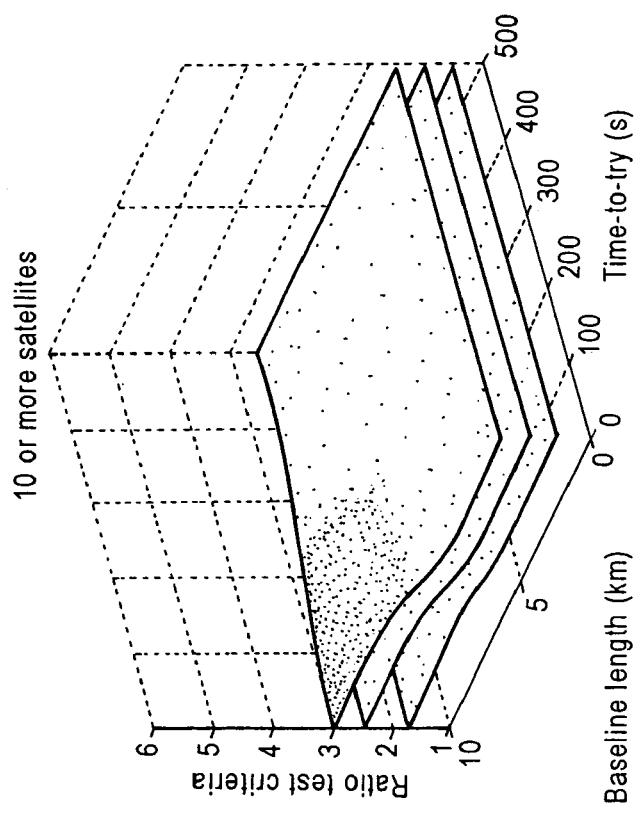
Figure 2E:
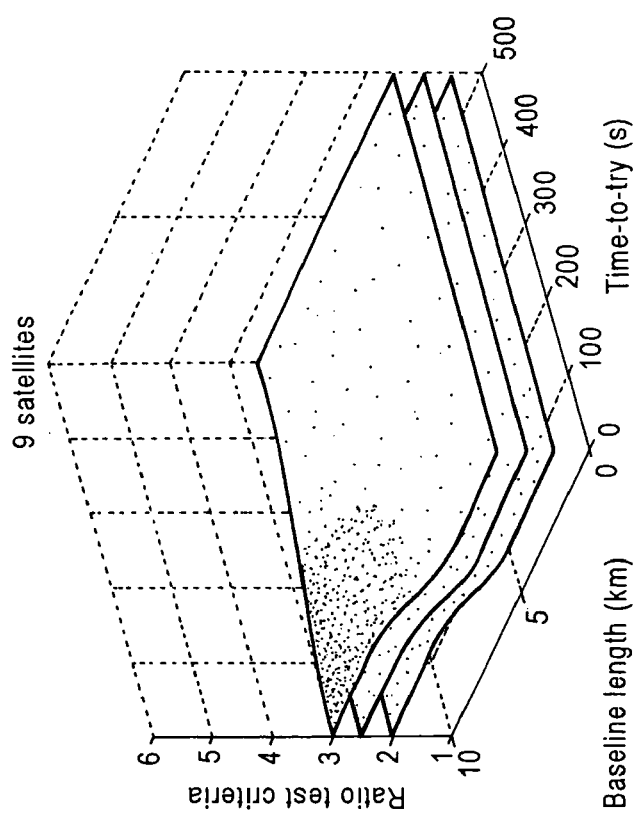

The enhanced RTK system of the present invention uses an integrated method incorporating a three-step quality control procedure. The integrated method combines the search procedures in the coordinate domain, the observation domain and the estimated ambiguity domain, and uses data from GPS receivers. The three-step procedure for enhancing the quality of ambiguity resolution is as follows. First, the stochastic model for the double-differenced functional model is improved in real-time. Second, the integer ambiguity sets which generate the minimum quadratic form of the residuals are discriminated from the second minimum quadratic form of residuals. An embodiment of the present invention uses a method deriving an empirical formula based on the different cases defined by baseline length in good or bad environments. Use of the method of the present invention overcomes the problem of the ratio test having no restrictive statistical meaning. Third, the method uses a fault detection, identification, and adaptation procedure. In this step, several receiver autonomous integrity monitoring algorithms were used, e.g. residual test, chi-square test, etc. Based on an unsuccessful ambiguity resolution, the adaptation procedure eliminates the identified outlier observations and improves the functional model, or executes a different type of Kalman filtering resets. The decision of whether to improve the functional model or execute the Kalman filtering reset is determined by receiver autonomous integrity monitoring algorithms and validation tests.

Functional Model

The relationship between carrier phase measurements and unknown parameters are derived using the following equations:

$$\lambda_1 \nabla\Delta\phi_1 = \nabla\Delta\rho + \lambda_1 \nabla\Delta N_1 - \nabla\Delta d_{ion} + (1+\epsilon)\cdot\nabla\Delta d_{trop} + \epsilon_{\nabla\Delta\phi_1} \quad \text{Equation 1A}$$

$$\lambda_2 \nabla\Delta\phi_2 = \nabla\Delta\rho + \lambda_2 \nabla\Delta N_2 - f_1^2/f_2^2 \cdot \nabla\Delta d_{ion} + (1+\epsilon)\cdot\nabla\Delta d_{trop} + \epsilon_{\nabla\Delta\phi_2} \quad \text{Equation 1B}$$

and pseudo-range measurements are derived using the following equations:

$$\nabla\Delta P_1 = \nabla\Delta\rho + \nabla\Delta d_{ion} + (1+\epsilon)\cdot\nabla\Delta d_{trop} + \epsilon_{\nabla\Delta P_1} \quad \text{Equation 2A}$$

$$\nabla\Delta P_2 = \nabla\Delta\rho + f_1^2/f_2^2 \cdot \nabla\Delta d_{ion} + (1+\epsilon)\cdot\nabla\Delta d_{trop} + \epsilon_{\nabla\Delta P_2} \quad \text{Equation 2B}$$

where:

$\Delta$ is a single differenced operator between receivers;

$\nabla$ is a single differenced operator between satellites;

$\nabla\Delta\phi$ and $\nabla\Delta P$ are double differenced carrier phase measurements and pseudo-range measurements;

$\nabla\Delta N$ is a double differenced integer ambiguity;

$\nabla\Delta\rho$ is a double differenced geometric distance between satellite and antenna physical phase center;

$\nabla\Delta d_{ion}{}^i$ and $\nabla\Delta d_{ion}{}^j$ are double differenced ionosphere delays;

$\nabla\Delta d_{trop}{}^i$ and $\nabla\Delta d_{trop}{}^j$ are double differenced troposphere delays;

$\epsilon$ is a scale factor of the troposphere delay computed based on models; and $\epsilon_{\nabla\Delta\phi_1}$, $\epsilon_{\nabla\Delta\phi_2}$, $\epsilon_{\nabla\Delta P_1}$, and $\epsilon_{59\ \Delta P_2}$ are noise for L1, L2 carrier phase, and pseudo-range measurements in meters. $f_1$ and $f_2$ are frequencies of L1 and L2 carrier signals, respectively.

Antenna position, ionosphere delay for each satellite, troposphere scale factor and integer ambiguities can be optionally set as unknown parameters in the optimal estimation system.

Stochastic Model

The measurement and modeling errors consist of measurement noise, multipath, ionosphere delay, troposphere delay, orbit bias, inter-channel bias and antenna offset and additional error sources indicated from warning messages. The warning message is received from a GPS receiver channel processing component which includes measurement quality, cycle slip flags etc. These biases are classified into two categories: distance-dependent biases and distance-independent biases. The biases are derived using the following equations:

$$R_{non-dist}^2 = R_{noise}^2 + R_{MP}^2 + R_{wm}^2 \quad \text{Equation 3A}$$

$$R_{dist}^2 = R_{ion}^2 + R_{trop}^2 + R_{orb}^2 \quad \text{Equation 3B}$$

Errors from inter-channel bias, antenna offset, etc. are assumed to be cancelled through double differencing in the above equations and only errors remaining in double differenced measurements are taken into account.

The standard deviation for errors from multipath and noise are derived using the following equations:

$$R_{non-dist,pseudorange}^2 = \sigma_P^2 \cdot (1.0 + 2.5 \cdot \exp(-E/15)) \quad \text{Equation 4A}$$

$$R_{non-dist,phase}^2 = \sigma_{100}^2 \cdot (1.0 + 7.5 \cdot \exp(-E/15)) \quad \text{Equation 4B}$$

where E is the satellite elevation. The stochastic model is dependent on a multipath template index and is pre-set in the RTK system. The default values of $\sigma_P$ and $\sigma_\phi$ for medium multipath or lower are $\sigma_P$=1.5 m and $\sigma_\phi$=0.02 cycles. It is to be understood by those skilled in the art that the preset multipath template index may be modified by issuing appropriate commands.

The variance-covariance matrix for double differenced measurements from the distance-independent errors is also derived based on the variance-covariance matrix of measurement noise and double differenced operator. The double differenced operator is a transformation matrix which transfer one way measurements to double differenced measurements.

Significant distance-dependent errors are removed through a differencing operator between receivers. The remaining errors of the ionosphere delay, troposphere delay and orbit bias are represented as a function of the distance between receivers. The default model is 1.5 ppm·distance, $10^{-4}$·HeightDiff+1.0 ppm·distance, and 0.1 ppm·distance for the residual ionosphere delay, troposphere delay, and orbit bias, respectively. If the distance-dependent errors are estimated in the Kalman filter state vector, the standard deviations are scaled by a factor, e.g. 0.2 or less. The variance-covariance matrix for double differenced measurements from the distance-dependent errors are derived based on the distance-dependent bias on single differenced measurements and single differenced operator which converts single differenced measurements to double differenced measurements.

The sum of the variance-covariance matrices from distance-independent errors and distance-dependent errors results in the variance-covariance matrix for double differenced measurements.

Kalman Filter Design

The Kalman filter state vector is shown in Table 1.

TABLE 1

Kalman Filtering State Vector

| Elements in State Vector | Dimension | Notes |
|---|---|---|
| Position component X (or Easting) | 1 | Mandatory |
| Velocity component X (or Easting) | 1 | Optional |
| Acceleration component X (or Easting) | 1 | Optional |
| Position component Y (or Northing) | 1 | Mandatory |
| Velocity component Y (or Northing) | 1 | Optional |
| Acceleration component Y (or Northing) | 1 | Optional |
| Position component Z (or Height) | 1 | Mandatory |
| Velocity component Z (or Height) | 1 | Optional |
| Acceleration component Z (or Height) | 1 | Optional |

TABLE 1-continued

Kalman Filtering State Vector

| Elements in State Vector | Dimension | Notes |
|---|---|---|
| Residual troposphere delay | 1 | Optional |
| Residual DD ionosphere delay | Nsat-1 | Optional |
| L1 DD ambiguity | Nsat-1 | Optional |
| L2 DD ambiguity | Nsat-1 | Optional |

Transition Matrix and Dynamic Noise

Position Parameters

When the observer is nearly stationary, such as a buoy drifting at sea, or crustal dam deformation, the position could be assumed as a random-walk process. In this case, three coordinate parameters are enough in the Kalman state vector for coordinate prediction. The transition matrix and dynamic noise are determined based on random walk model using the equations below:

$$\phi_{k,k-1} = e^{F(t_k - t_{k-1})} = 1 \qquad \text{Equation 5A}$$

$$Q_k = \sigma_u^2 (t_k - t_{k-1}) \qquad \text{Equation 5B}$$

which is called a position model.

When the observer is not stationary but moving with nearly constant velocity, the velocity is not white noise but a random-walk process. In this case, three coordinate parameters and three velocity parameters must be included in the Kalman state vector for coordinate prediction. The transition matrix and dynamic noise can be determined based on an integrated random walk model according to the below equations:

$$\phi_{k,k-1} = \begin{bmatrix} 1 & (t_k - t_{k-1}) \\ 0 & 1 \end{bmatrix} \qquad \text{Equation 6A}$$

$$Q_k = \sigma_u^2 \begin{bmatrix} \frac{(t_k - t_{k-1})^3}{3} & \frac{(t_k - t_{k-1})^2}{2} \\ \frac{(t_k - t_{k-1})^2}{2} & (t_k - t_{k-1}) \end{bmatrix} \qquad \text{Equation 6B}$$

which is called a position-velocity model.

The position-velocity model is inadequate for cases where the near-constant velocity assumption is incorrect, that is, in the presence of severe or greater than nominal accelerations. Another degree of freedom is added for each position state becoming a Position-Velocity-Acceleration model or a Gauss-Markov process in place of the nonstationary random walk model for acceleration.

The specific model used depends on the intended application. For extremely high dynamic motion applications, the dynamic noise increases even using a Position-Velocity-Acceleration model. In this case, the dynamic noise compensates for errors which are not accounted for in the model. Spectral amplitude determination for position random processes is estimated based on expected vehicle dynamics. In many vehicular applications, the random perturbations are greater in the horizontal plane than in the vertical and are accounted for by selecting a lower spectral amplitude value for an altitude channel than for the other two horizontal channels.

Ambiguity Parameters

The transition matrix and dynamic noise for ambiguity parameters in Kalman state vector are derived using the following equations:

$$\phi_{k,k-1} = e^{F(t_k - t_{k-1})} = 1 \qquad \text{Equation 7A}$$

$$Q_k = 0 \qquad \text{Equation 7B}$$

Troposphere Scale Parameter

The troposphere scale parameter $\epsilon$ represents the percentage change of the troposphere delay. For a particular location, the troposphere delay for all satellites is scaled by the same factor independent of the satellite elevation and includes some approximation. Empirically, the scale factor is modeled as a Gauss-Markov process. The transition matrix and dynamic model is then derived using the following equations:

$$\phi_{k,k-1} = e^{-\beta_{trop}(t_k - t_{k-1})} \qquad \text{Equation 8A}$$

$$Q_k = \sigma_{trop}^2 (1 - e^{-2\beta_{trop}(t_k - t_{k-1})}) \qquad \text{Equation 8B}$$

where $1/\beta_{trop}$ is the correlation time of the troposphere wet component and $\sigma^2_{trop}$ represents the wet component changing level, which are a function of the baseline length and the height difference.

Ionosphere Delay Parameters

The ionosphere delay difference between both ends of a baseline is specified as an unknown parameter in the Kalman filter state vectors and is a function of the local time, ionosphere activities, distance and direction of two intersections of the receiver-satellite rays with equivalent ionosphere layer from both ends of the baseline. Empirically, the ionosphere delay difference is estimated by a Gauss-Markov model. The transition matrix and dynamic model are expressed using the following equations:

$$\phi_{k,k-1} = e^{-\beta_{ion}(t_k - t_{k-1})} \qquad \text{Equation 9A}$$

$$Q_k = \sigma_i^2 (1 - e^{-2\beta_{ion}(t_k - t_{k-1})}) \qquad \text{Equation 9B}$$

where $1/\beta_{ion}$ is the correlation time of single differenced ionosphere delay and $\sigma^2_{ion}$ represents the variation level of the delay.

Ambiguity Resolution

The double differenced float solution and the variance-covariance matrix of these elements are extracted using Kalman filtering and are then provided to an ambiguity search procedure based on double differenced ambiguity $\Delta \nabla N$ and variance-covariance matrix $D_{\Delta \nabla N}$. The double differenced ambiguity is first decorrelated using a LAMBDA transformation approach.

After the decorrelation procedure, the ambiguity searching procedure is performed with the goal of finding an integer ambiguity set $\Delta \nabla n$ meeting the criteria below:

$$(\Delta \nabla N - \Delta \nabla n)^T D_{\Delta \nabla N}^{-1} (\Delta \nabla N - \Delta \nabla n) = \min \qquad \text{Equation 10}$$

A detailed search procedure usable in conjunction with an embodiment of the present invention is described by equations (42–47) in Han & Rizos, "A New Method for Constructing Multi-satellite Ambiguity Combinations for Improved Ambiguity Resolution," *Proceedings of ION GPS-95, 8th International Technical Meeting of The Satellite Division of The Institute of Navigation* (1995), pp. 1145–1153. Once the integer ambiguity set deriving the minimum value of the above quadratic form is derived, the integer ambiguity set is verified by the ratio value of the minimum value and the second minimum value. If the ratio value is greater than the specified validation criteria, then the integer ambiguity set deriving the minimum value is identified as the solution for the ambiguity set. If the validation criteria is greater than the ratio value, the integer ambiguity set is rejected and the set of possible ambiguity fix solutions is reduced. On the other hand, if the validation criteria is set too small, the resultant integer ambiguity set might not be the correct one and the ambiguity fixed solution will be wrong. Therefore, validation criteria determination is key for improving RTK performance.

Once the integer ambiguities are fixed the corresponding rows and columns in the variance-covariance matrix are replaced with zeros. In this sense, ambiguity fixing means that the unknown initial integer cycles of the corresponding carrier phase measurements have been determined and the carrier phase measurements have been corrected by integer numbers.

Validation Criteria

Reliable results are dependent on the appropriateness of the stochastic model of the observations with respect to the functional model. The validation criteria are used to check the fidelity of the stochastic and functional models. Outlier detection, identification, and adaptation are important algorithmic tasks to increase the opportunity for ambiguity fixing as quick as possible. In fact, outliers or significant errors in pseudo-range or carrier phase measurements bias the float ambiguity estimation and, hence, offset the quadratic form of residuals. Once outliers are detected, identified and adapted through functional modeling and/or stochastic modeling, the correct integer ambiguity set is then successfully identified from other integer ambiguity sets.

A large number of integer ambiguity sets are included in the search region in the estimated ambiguity domain based on the results of the ambiguity float solution. A series of validation criteria are used to distinguish the correct integer ambiguity set from other integer ambiguity sets. The validation criteria are required to minimally accept wrong integer ambiguity sets and maximally accept the correct ambiguity set. Reliability is defined as the ratio between the number of correct solutions and the total number of solutions, which is controlled by validation criteria. Meeting the reliability requirement has the highest priority for determining whether the positioning solution is accepted or not, rather than time-to-fix. Time-to-fix is the resultant parameter indicating the length of the observation span required to select the integer ambiguity set.

The validation criteria and settings are developed based on different categories of data, e.g. based on baseline length and/or based on an open or canopy environment. For each category, we used the same validation criteria functions. The validation criteria function is dependent on the number of satellites, baseline length, preset reliability, time-to-try and an ionosphere activity indicator. Therefore, the validation criteria function is an empirical formula which is finalized using different data sets. The greater the number of typical data sets used, the more reliable are the coefficients of the empirical formula.

For each pre-set reliability, the following equation of baseline length and time-to-try can be fitted in each case classified based on ionosphere activities and environment conditions.

$$F(t, d) = \begin{cases} f(d) & t <= t_1 \\ f(d) - \dfrac{2 \cdot (f(d) - f(0))}{(t_2 - t_1)^3} \cdot \left(\dfrac{3}{2}(t_2 - t_1)(t - t_1)^2 - (t - t_1)^3\right) & t_1 < t < t_2 \\ f(0) & t >= t_2 \end{cases} \quad \text{Equation 11}$$

where f(d) is a function of baseline length d according to the following equation:

$$f(d) = \begin{cases} f_{\min} & d <= d_1 \\ f_{\min} + \dfrac{2 \cdot (f_{\max} - f_{\min})}{(d_2 - d_1)^3} \cdot \left(\dfrac{3}{2}(d_2 - d_1)(d - d_1)^2 - (d - t_1)^3\right) & d_1 < d < d_2 \\ f_{\max} & d >= d_2 \end{cases} \quad \text{Equation 12}$$

where t is the time-to-try starting from a first initialization epoch and d is the baseline length in kilometers.

If there are enough samples, $t_1$, $t_2$, $d_1$ and $d_2$ are estimated in addition to $f_{min}$ and $f_{max}$. However, in the more frequent embodiment, $t_1$, $t_2$, $d_1$ and $d_2$ are empirically chosen to simplify the procedure, e.g. $t_1$=20 s, $t_2$=140+d*30 s, $d_1$=3 km and $d_2$=7 km in the RTK system for short-range applications. At least two baselines (one shorter than $d_1$ and the other longer than $d_2$) are required to tune $f_{min}$ and $f_{max}$. As more baselines are used, the reliability of the estimation increases. Therefore, two numbers, $f_{min}$ and $f_{max}$, are derived for each case. For example, the following matrix is derived for normal ionosphere activity and open environment, normal ionosphere activity and canopy environment, severe ionosphere activity and open environment, and sever ionosphere activity in canopy environment.

TABLE 2

$f_{max}$ values for normal ionosphere activity and good environment

|  | 5 | 6 | 7 | 8 | 9 | 10 or more |
|---|---|---|---|---|---|---|
| 95% | 3.0 | 2.75 | 2.5 | 2.0 | 2.0 | 1.75 |
| 99% | 4.5 | 4.00 | 3.5 | 2.5 | 2.5 | 2.5 |
| 99.9% | 5.0 | 4.50 | 4.5 | 3.5 | 3.0 | 3.0 |

TABLE 3

$f_{min}$ values for normal ionosphere activity and good environment

|  | 5 | 6 | 7 | 8 | 9 | 10 or more |
|---|---|---|---|---|---|---|
| 95% | 2.5 | 2.25 | 2.0 | 1.75 | 1.5 | 1.5 |
| 99% | 3.0 | 2.75 | 2.5 | 2.0 | 2.0 | 2.0 |
| 99.9% | 4.0 | 3.5 | 3.0 | 2.5 | 2.5 | 2.5 |

FIG. 2 depicts the criteria value as a function of reliability criteria, satellite number, baseline length and observation time used to derive a float solution. The top, middle, and bottom plots depict reliability levels at 99.9%, 99%, and 95%, respectively.

Based on normal or severe activity and open or canopy environment, the appropriate validation criteria table is picked. Based on the number of satellites, pre-set reliability, the appropriate maximum and minimum values are selected. Based on the baseline length and time-to-try, the validation criteria value is calculated using the selected maximum and minimum values.

In performing a check for an incorrect fix, either true ambiguities or true position must be known. If the true ambiguities are obtainable using post-processing software, making a comparison to determine whether an ambiguity fix is correct or not is easier to perform. If the baseline vector is known, the difference between derived coordinates and known coordinates should be less 8 cm+1 ppm and 12 cm+1.5 ppm for horizontal components and vertical components, respectively, but not over 12 cm and 18 cm. In this application, ppm means increase 1 mm per kilometer.

Based on the calculated vertical electron content (VEC) value from the broadcast ionosphere model, the ionosphere activity can be classified as either normal and severe ionosphere activity.

If 50% of directions are blocked over 30 degrees in elevation, the environment is defined as a canopy environment. Otherwise, the environment is defined as an open environment. The left skyplot in FIG. 3 depicts an open environment and the right skyplot depicts a canopy environment.

Adaptation

If the resolved integer ambiguities are incorrect, in general the incorrect integer ambiguities refer to more than one satellite, and the incorrect ambiguity is almost impossible to identify. However, the fact that some biases are present in the observations can be confirmed.

If instantaneous ambiguity resolution is required, the minimum number of satellites required is five. If six or more satellites are observed, some of the observations are eliminated. Because the outliers are not located, all combinations of five or more satellites from all observed satellites are tested. This procedure has been implemented in software by eliminating one (or more) satellite (at least five satellites are kept), starting with the lowest elevation satellite observation. If the ambiguity resolution fails, the procedure is repeated until ambiguity resolution is successful. If all possible sets of five or more satellites are combined and ambiguity resolution still fails, the ambiguity resolution procedure is considered to have failed. This procedure ensures that the ambiguity resolution success rate increases significantly.

The adaptation also includes a stochastic model adaptation based on the real environment and a Kalman filtering reset. The stochastic model parameter will be adapted using post-fit residuals in real-time.

Process Flow

Figure 4:
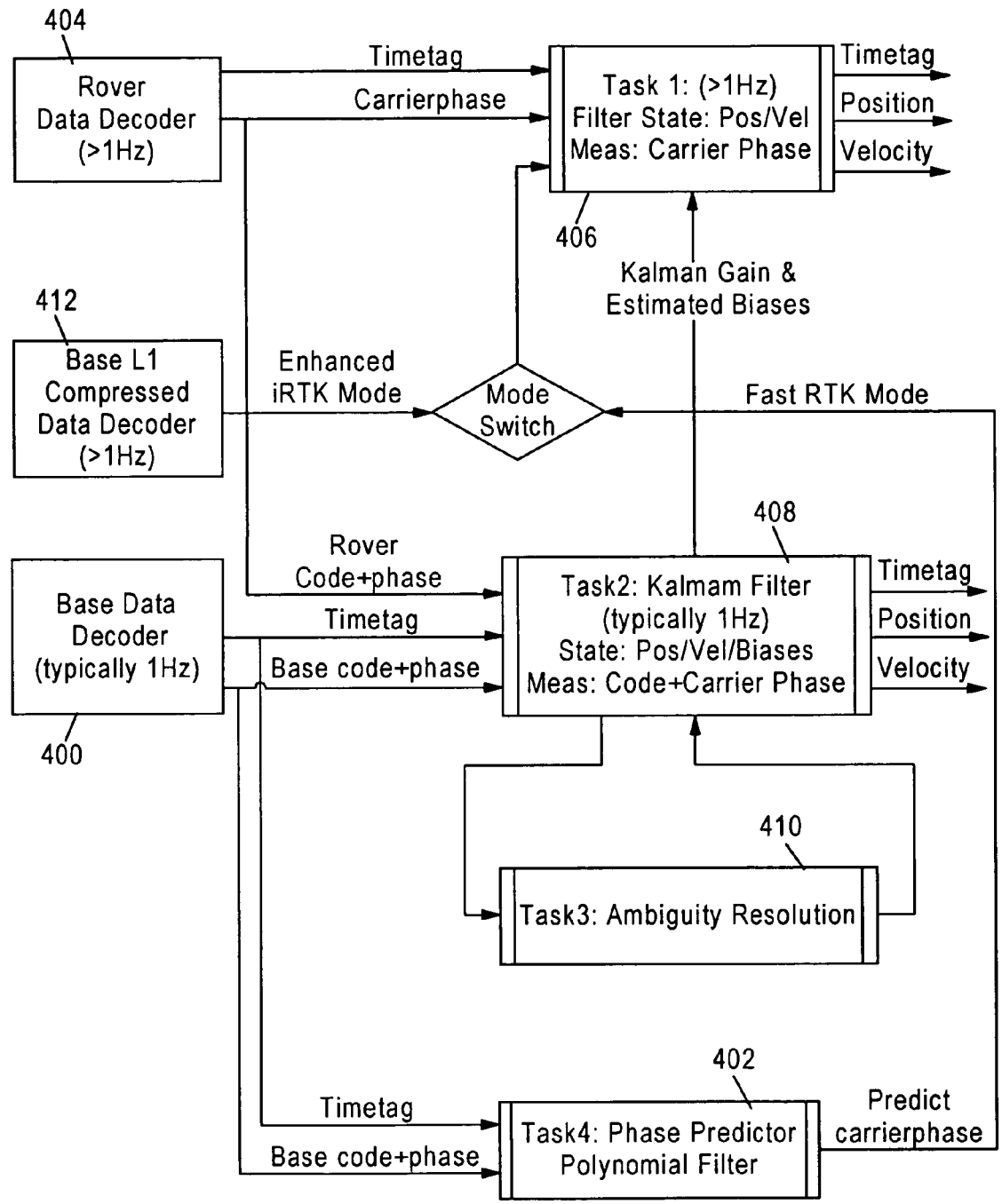
FIG. 4 is a high level flow diagram of a process according to an embodiment of the present invention.

FIG. 4 depicts the process flow of an RTK method according to an embodiment of the present invention. Low rate, nominally 1 Hz, base station measurements output from a base data decoder 400 are output to a polynomial fitting function executed in a phase predictor process 402, e.g. second order or higher order polynomial, and a Kalman filter process 408. Base data decoder 400 decodes raw GPS measurements received from a base GPS receiver (not shown). The sampling rate (or update rate) of base data decoder 400 is nominally 1 Hz. Higher sampling rates may be used with a proportional increase in cost and baud rate for the data link. In one embodiment of the present invention, the update rate does not exceed 1 Hz. If a higher sampling rate is required, an embodiment according to the description embodied in co-pending patent application titled, "Enhanced Rapid Real-Time Kinematic Determination Method and Apparatus," by the present inventors and assigned to the present assignee would be used.

In order to reduce the position update time delay, phase predictor process 402 predicts corrections for the position calculation using available corrections transmitted from the base GPS receiver as decoded and output from base data decoder 400 in conjunction with polynomial filtering. The positioning accuracy degrades depending on the length of the predicted period.

Kalman filter process 408, described in detail below with reference to FIG. 5, calculates optimal solutions, i.e. position and/or velocity, based on currently available measurements from base data decoder 400 and rover data decoder 404. An ambiguity resolution process 410 is a part of Kalman filter process 408 and is described in detail below with reference to FIG. 5.

A rover data decoder 404 decodes raw GPS measurements and ephemeris received from the rover GPS receiver (not shown) and provides time tagged carrier phase measurements to a carrier phase process 406. The sampling rate (or update rate) of rover data decoder 404 can be up to 10 Hz or higher.

Output estimated polynomial parameters from phase predictor 402 are used by carrier phase process 406 to predict the base station measurement at a rate matching the RTK update rate, typically 10 Hz or higher. The RTK solution latency is primarily determined by the rover measurement data collection time and the RTK position computation time. The base station prediction time is a negligible delay. Typically, RTK solution latency is less than 20 milliseconds depending on microprocessor speed.

For embodiments requiring an update rate in time-tagged mode of 1 Hz or lower, carrier phase process 406 uses the output from Kalman filter 408 to calculate and output the rover GPS receiver position and/or velocity. For embodiments requiring an update rate in RTK mode of 1 Hz or lower, carrier phase process 406 uses the most recent measurements from rover data decoder 404 and the predicted correction output from phase predictor 402 to calculate and output the most recent position and/or velocity of the rover GPS receiver.

To reduce the RTK position computation time, only an L1 carrier phase measurement output from a rover data decoder 404 is used. The rover L1 carrier phase measurement and the predicted base station L1 carrier phase measurement output from phase predictor 402 are then used to derive L1 double difference measurements in 406. The estimated L1 integer ambiguities, residual ionosphere delay, residual troposphere delay and other bias parameters are used to correct the double difference measurement in 406. The corrected double difference measurement is output into a least squares (LSQ) estimator to calculate a rover position in 406. The velocity is calculated in a similar manner using rover L1 Doppler measurements and predicted base L1 carrier phase rate. Because of the requirement of base station measurement prediction, the RTK solution accuracy is degraded in comparison to a matched time-tag RTK solution. With Selective Availability (S/A), the rate of degradation increases due to the inability to predict S/A. Selective availability is known to persons of skill in the art and refers to the intentional degradation of the absolute positioning performance capabilities of the GPS for civilian use accomplished by artificial "dithering" of satellite clock error.

Figure 5:
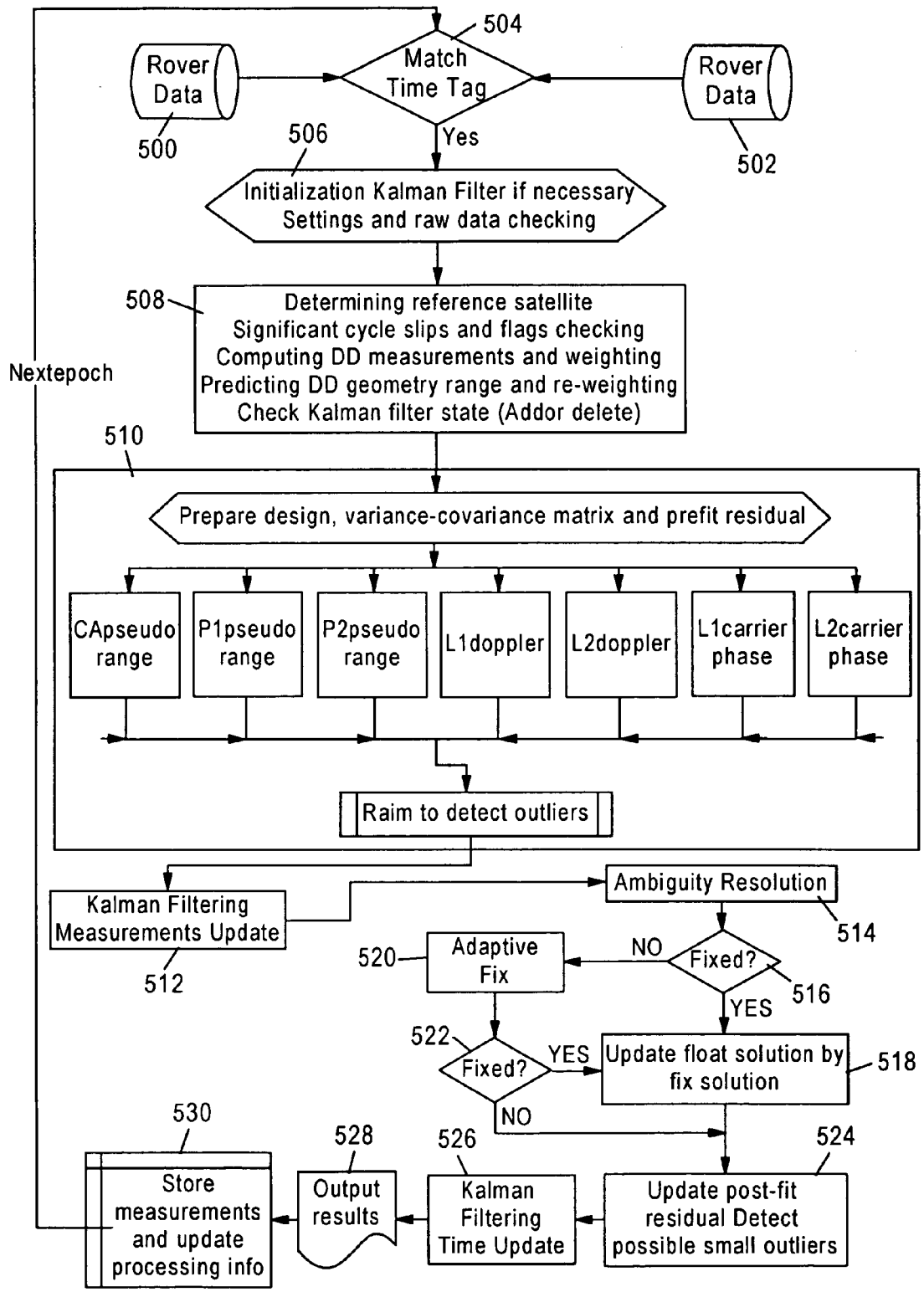
FIG. 5 is a flow diagram of a portion of the FIG. 4 flow diagram according to an embodiment of the present invention.

With reference to FIG. 5, details of Kalman filter process 408 and ambiguity resolution process 410 in FIG. 4 are now described. Data from both a base GPS receiver (not shown) and a rover GPS receiver (not shown) is received, decoded, and output by base data decoder 400 and rover data decoder 404, respectively. Base data 500 and rover data 502 time tags are matched in match time tag step 504, thereby matching the time when the respective measurements were made.

After the time tags are matched, the matched data output from match time tag step 504 is input to a Kalman filter. In step 506, if the matched data output is in the first epoch or if a reset of the Kalman filter is required, the Kalman filter is initialized in step 506. In step 508, a reference satellite is selected to determine the double differenced measurement. Further, cycle slips are checked using cycle slip flags and a stochastic model is calculated.

The flow proceeds to step 510 for the preparation of the design matrix, variance-covariance matrix (stochastic model) and calculation of pre-fit residuals for all measurements, e.g. C/A pseudo-range, P1 pseudo-range, P2 pseudo-range, L1 Doppler, L2 Doppler, L1 carrier phase and L2 carrier phase measurements. The output of the pre-fit residual calculation is input to a Receiver Autonomous Integrity Monitoring (RAIM) algorithm to detect outliers. RAIM is a form of receiver self-checking using redundant pseudo-range observations to detect if a problem with any of the measurements exists.

The output of step 510 is provided as input to a Kalman filter measurement update step 512 to sequentially filter all measurements and provide filtered output measurements to an ambiguity resolution step 514. The update step provides the optimal estimation results using all available measurements.

The validation criteria are calculated using the above-described method in step 514 and a determination of whether the integer ambiguities can be fixed or not is performed in step 516. If the step 516 determination is positive (the integer ambiguities can be fixed), the float solution is updated to the fix solution in step 518. If the step 516 determination is negative (the integer ambiguities cannot be fixed), the above-described adaptive fix procedure is performed in step 520 to attempt to fix ambiguities and a second determination of whether the integer ambiguities can be fixed or not is performed in step 522. If the step 522 determination is positive (the integer ambiguities can be fixed), the float solution is updated to the fix solution in step 518 and the flow proceeds to step 524 wherein the post-fit residuals are updated and possible outliers are detected. If the step 522 determination is negative (the integer ambiguities cannot be fixed), the flow proceeds to step 524 described above.

The output of step 524 is provided to a Kalman filtering time update 526, which is a Kalman filtering prediction step. In step 528, all necessary information is outputted and in step 530 the measurements are stored and the processing information is updated based on the above-described method. The flow proceeds to process the next epoch of data returning to step 504.

In coordination with the above-described technique, an embodiment of the present invention provides an improved method of and apparatus for determining real time kinematics, and more specifically determines the kinematics in an accurate manner.

FIG. 6 is a block diagram illustrating an exemplary computer 600 upon which an embodiment of the invention may be implemented. The present invention is usable with currently available handheld and embedded devices, e.g. GPS receivers, and is also applicable to personal computers, mini-mainframes, servers and the like.

Computer 600 includes a bus 602 or other communication mechanism for communicating information, and a processor 604 coupled with the bus 602 for processing information. Computer 600 also includes a main memory 606, such as a random access memory (RAM) or other dynamic storage device, coupled to the bus 602 for storing GPS data signals according to an embodiment of the present invention and instructions to be executed by processor 604. Main memory 606 also may be used for storing temporary variables or other intermediate information during execution of instructions to be executed by processor 604. Computer 600 further includes a read only memory (ROM) 608 or other static storage device coupled to the bus 602 for storing static information and instructions for the processor 604. A storage device 610 (dotted line), such as a compact flash, smart media, or other storage device, is optionally provided and coupled to the bus 602 for storing instructions.

Computer system 600 may be coupled via the bus 602 to a display 612, such as a cathode ray tube (CRT) or a flat panel display, for displaying an interface to the user. An input device 614, including alphanumeric and function keys, is coupled to the bus 602 for communicating information and command selections to the processor 604. Another type of user input device is cursor control 616, such as a mouse, a trackball, or cursor direction keys for communicating direction information and command selections to processor 604 and for controlling cursor movement on the display 612. This input device typically has two degrees of freedom in two axes, a first axes (e.g., x) and a second axis (e.g., y) allowing the device to specify positions in a plane.

The invention is related to the use of computer 600, such as the depicted computer of FIG. 6, to perform accurate, real-time, kinematics determination. According to one embodiment of the invention, data signals are received via a navigation interface 619, e.g. a GPS receiver, and processed by computer 600 and processor 604 executes sequences of instructions contained in main memory 606 in response to input received via input device 614, cursor control 616, or communication interface 618. Such instructions may be read into main memory 606 from another computer-readable medium, such as storage device 610. A user interacts with the system via an application providing a user interface displayed on display 612.

However, the computer-readable medium is not limited to devices such as storage device 610. For example, the computer-readable medium may include a floppy disk, a flexible disk, hard disk, magnetic tape, or any other magnetic medium, a compact disc-read only memory (CD-ROM), any other optical medium, punch cards, paper tape, any other physical medium with patterns of holes, a random access memory (RAM), a programmable read only memory (PROM), an erasable PROM (EPROM), a Flash-EPROM, any other memory chip or cartridge, a carrier wave embodied in an electrical, electromagnetic, infrared, or optical signal, or any other medium from which a computer can read. Execution of the sequences of instructions contained in the main memory 606 causes the processor 604 to perform the process steps described above. In alternative embodiments, hard-wired circuitry may be used in place of or in combination with computer software instructions to implement the invention. Thus, embodiments of the invention are not limited to any specific combination of hardware circuitry and software.

Computer 600 also includes a communication interface 618 coupled to the bus 602 and providing two-way data communication as is known in the art. For example, communication interface 618 may be an integrated services digital network (ISDN) card, a digital subscriber line (DSL) card, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals which carry digital data streams representing various types of information. Of particular note, the communications through interface 618 may permit transmission or receipt of instructions and data to be processed according to the above method. For example, two or more computers 600 may be networked together in a conventional manner with each using the communication interface 618.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals which carry digital data streams. The signals through the various networks and the signals on network link 620 and through communication interface 618, which carry the digital data to and from computer 600, are exemplary forms of carrier waves transporting the information.

Computer 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer 600 may obtain application code in the form of a carrier wave.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of providing the validation criteria including improved real time kinematics determination, comprising the steps of:
    determining a position estimate using an integrated method;
    determining validation criteria, comprising the steps of:
        tuning a stochastic model of observations;
        selecting a typical data set for baselines;
        setting validation criteria to preset values and executing an RTK process;
        summarizing RTK process results as a function of (1) fixing percentage over total resets and (2) wrong fix percentage over total fixes for each number of satellites, for each of ionosphere activity and environment type;
        derive validation criteria values for each preset reliability for each baseline having a different number of satellites;
        fitting a function of baseline length and time-to-try classified based on ionosphere activity and environment condition for each preset reliability; and
        selecting a validation criteria set based on ionosphere activity and environment type;
    enhancing ambiguity resolution of the position estimate by applying a quality control procedure using the derived validation criteria; and
    deriving a second position estimate based on the enhanced ambiguity resolution.

2. The method as claimed in claim 1, wherein the validation criteria include baseline length, time-to-try, number of satellites, present reliability, ionosphere activity, and environment type.

3. The method as claimed in claim 1, wherein the integrated method uses signals received by a GPS receiver.

4. The method as claimed in claim 3, wherein the signals are received at an update rate of 1 Hz or lower.

5. The method as claimed in claim 1, wherein the integrated method comprises the steps of:
    determining the position estimate in a coordinate domain;
    determining the position estimate in an observation domain;
    determining the position estimate in an estimated ambiguity domain; and
    integrating the determined position estimates.

6. The method as claimed in claim 1, wherein the quality control procedure comprises the steps of:
    improving a stochastic model for a double-differenced functional model in real-time;
    discriminating between an integer ambiguity sets generating the minimum quadratic form of the residuals and a second minimum one; and
    performing a fault detection, identification, and adaptation procedure.

7. The method as claimed in claim 6, wherein the fault detection, identification, and adaptation procedure comprises the steps of:
    evaluating a global measure;
    evaluating receiver autonomous integrity monitoring methods; and
    if the ambiguity resolution is unsuccessful, eliminating the identified outlier observations and updating the double-differenced functional model or executing a different type Kalman filtering resets.

8. The method as claimed in claim 1, further comprising the step of:
    selecting a maximum and minimum value as a function of number of satellites and pre-set reliability.

9. The method as claimed in claim 1, further comprising the step of:
    calculating validation criteria value using the selected maximum and minimum values as a function of the baseline length and time-to-try.

10. The method as claimed in claim 1, wherein the function of baseline length and time-to-try is:

$$F(t, d) = \begin{cases} f(d) & t <= t_1 \\ f(d) - \dfrac{2 \cdot (f(d) - f(0))}{(t_2 - t_1)^3} \cdot & t_1 < t < t_2 \\ \left(\dfrac{3}{2}(t_2 - t_1)(t - t_1)^2 - (t - t_1)^3\right) & \\ f(0) & t >= t_2. \end{cases}$$

11. The method as claimed in claim 9, wherein the function of baseline length is:

$$f(d) = \begin{cases} f_{min} & d <= d_1 \\ f_{min} + \dfrac{2 \cdot (f_{max} - f_{min})}{(d_2 - d_1)^3} \cdot & d_1 < d < d_2 \\ \left(\dfrac{3}{2}(d_2 - d_1)(d - d_1)^2 - (d - t_1)^3\right) & \\ f_{max} & d >= d_2. \end{cases}$$

12. The method as claimed in claim 1, further comprising the steps of:
   determining a position estimate using an integrated method;
   enhancing ambiguity resolution of the position estimate by applying a quality control procedure using the derived validation criteria; and
   deriving a second position estimate based on the enhanced ambiguity resolution.

13. The method as claimed in claim 12, wherein the quality control procedure using the validation criteria comprises discriminating between the integer ambiguity sets generating the minimum quadratic form of the residuals and the second minimum one.

14. A method of determining validation criteria used to identify a correct integer ambiguity set from more than one integer ambiguity set in an estimated ambiguity domain, the method comprising the steps of:
   tuning a stochastic model of observations;
   selecting a typical data set for baselines;
   setting validation criteria to preset values and executing an RTK process;
   summarizing RTK process results as a function of (1) fixing percentage over total resets and (2) wrong fix percentage over total fixes for each number of satellites, for each of ionosphere activity and environment type;
   determining validation criteria values for each preset reliability for each baseline having a different number of satellites;
   fitting a function of baseline length and time-to-try classified based on ionosphere activity and environment condition for each preset reliability; and
   selecting a validation criteria set based on ionosphere activity and environment type.

15. The method as claimed in claim 14, further comprising the step of:
   selecting a maximum and minimum value as a function of number of satellites and pre-set reliability.

16. The method as claimed in claim 15, further comprising the step of:
   calculating validation criteria value using the selected maximum and minimum values as a function of the baseline length and time-to-try.

17. The method as claimed in claim 15, wherein the function of baseline length is:

$$f(d) = \begin{cases} f_{min} & d <= d_1 \\ f_{min} + \dfrac{2 \cdot (f_{max} - f_{min})}{(d_2 - d_1)^3} \cdot & d_1 < d < d_2 \\ \left(\dfrac{3}{2}(d_2 - d_1)(d - d_1)^2 - (d - t_1)^3\right) & \\ f_{max} & d >= d_2. \end{cases}$$

18. The method as claimed in claim 14, wherein the function of baseline length and time-to-try is:

$$F(t, d) = \begin{cases} f(d) & t <= t_1 \\ f(d) - \dfrac{2 \cdot (f(d) - f(0))}{(t_2 - t_1)^3} \cdot & t_1 < t < t_2 \\ \left(\dfrac{3}{2}(t_2 - t_1)(t - t_1)^2 - (t - t_1)^3\right) & \\ f(0) & t >= t_2. \end{cases}$$

19. A computer readable medium comprising:
   at least one sequence of machine executable instructions in machine form, wherein execution of the instructions by a processor cause the processor to:
   determine a position estimate using an integrated method; and
   derive validation criteria, wherein the validation criteria determination comprises a sequence of machine executable instructions which, when executed by a processor, cause the processor to:
   tune a stochastic model of observations;
   select a typical data set for baselines;
   set validation criteria to preset values and executing an RTK process;
   summarize RTK process results as a function of (1) fixing percentage over total resets and (2) wrong fix percentage over total fixes for each number of satellites, for each of ionosphere activity and environment type;
   determine validation criteria values for each preset reliability for each baseline having a different number of satellites;
   fit a function of baseline length and time-to-try classified based on ionosphere activity and environment condition for each preset reliability; and
   select a validation criteria set based on ionosphere activity and environment type;
   enhance ambiguity resolution of the position estimate by applying a quality control procedure using derived validation criteria; and
   derive a second position estimate based on the enhanced ambiguity resolution.

20. The medium as claimed in claim 19, wherein the validation criteria include baseline length, time-to-try, number of satellites, present reliability, ionosphere activity, and environment type.

21. The medium as claimed in claim 19, wherein the quality control procedure comprises a sequence of machine executable instructions which, when executed by a processor, cause the processor to:
   improve the stochastic model for the double-differenced functional model in real-time;
   discriminate between the integer ambiguity sets generating the minimum quadratic form of the residuals and the second minimum one; and perform a fault detection, identification, and adaptation procedure.

22. An apparatus for providing improved, real time kinematics determination, the apparatus comprising:
- determining means for determining a position estimate using an integrated method;
- determining validation criteria, comprising the steps of:
  - tuning a stochastic model of observations;
  - selecting a typical data set for baselines;
  - setting validation criteria to preset values and executing an RTK process;
  - summarizing RTK process results as a function of (1) fixing percentage over total resets and (2) wrong fix percentage over total fixes for each number of satellites, for each of ionosphere activity and environment type;
  - derive validation criteria values for each preset reliability for each baseline having a different number of satellites;
  - fitting a function of baseline length and time-to-try classified based on ionosphere activity and environment condition for each preset reliability; and
  - selecting a validation criteria set based on ionosphere activity and environment type;
- enhancing means for enhancing ambiguity resolution of the position estimate by applying a quality control procedure using derived validation criteria; and
- deriving means for deriving a second position estimate based on the enhanced ambiguity resolution.

23. The apparatus as claimed in claim 22, wherein the validation criteria include baseline length, time-to-try, number of satellites, present reliability, ionosphere activity, and environment type.

24. The apparatus as claimed in claim 22, wherein the integrated method comprises:
- determining means for determining a position estimate in the coordinate domain, a position estimate in the observation domain, and a position estimate in the estimated ambiguity domain; and
- determining means for integrating the determined position estimates.

25. The apparatus as claimed in claim 22, wherein the integrated method uses signals received by a GPS receiver.

26. The apparatus as claimed in claim 25, wherein the signals are received at an update rate of 1 Hz or lower.

27. A method of determining validation criteria for real time kinematics determination, comprising the steps of:
- tuning a stochastic model of observations;
- selecting a typical data set for baselines;
- setting validation criteria to preset values and executing an RTK process;
- summarizing RTK process results as a function of (1) fixing percentage over total resets and (2) wrong fix percentage over total fixes for each number of satellites, for each of ionosphere activity and environment type;
- deriving validation criteria values for each preset reliability for each baseline having a different number of satellites;
- fitting a function of baseline length and time-to-try classified based on ionosphere activity and environment condition for each preset reliability; and
- selecting a validation criteria set based on ionosphere activity and environment type;
- wherein the validation criteria set includes baseline length, time-to-try, number of satellites, present reliability, ionosphere activity, and environment type.

* * * * *